DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1324

T883,030

IMPARTING FLAVOR TO AND RETAINING FLAVOR IN FOOD PRODUCTS BY COATING WITH ACETYLATED MONOGLYCERIDES

Louis J. Lee, P.O. Box 511, Kingsport, Tenn. 37662

Filed June 22, 1970, Ser. No. 48,495

Int. Cl. A23l *1/22;* A23b *1/10*

U.S. Cl. 99—140

No Drawing. 9 Pages Specification

An artificial flavor may be imparted to and retained in various foodstuffs such as meats, fish, cheese, raisins, nuts and the like by adding the flavor to the foodstuff in either frozen or unfrozen condition followed by dipping the treated food in a molten bath of distilled acetylated monoglycerides, withdrawing the foodstuff from the bath and cooling to room temperature, forming a solid, waxy, protective coating thereon. Similar coating of an untreated foodstuff locks in its natural flavor, which is retained even after storage in frozen condition for long periods of time. Coating of the foodstuff in this manner also prevents loss of moisture which may otherwise cause so-called "freezer burn" rendering frozen food undesirable. By dispersing a small amount of a food antioxidant in the monoglycerides before application to a foodstuff, additional protection from oxidative deterioration is provided.